(No Model.)

C. E. DYER.
HITCHING DEVICE.

No. 282,968. Patented Aug. 14, 1883.

Witnesses
Henry Chadbourn.
H. Allen

Inventor
Charles E. Dyer
by Alban Andrew
his att'y.

UNITED STATES PATENT OFFICE.

CHARLES E. DYER, OF MALDEN, MASSACHUSETTS.

HITCHING DEVICE.

SPECIFICATION forming part of Letters Patent No. 282,968, dated August 14, 1883.

Application filed January 15, 1883. (No model.)

*To all whom it may concern:*

Be it known that I, CHARLES E. DYER, a citizen of the United States, residing at Malden, in the county of Middlesex and State of Massachusetts, have invented certain new and useful Improvements in Animal-Hitching Devices, and that the same are fully described in the following specification and illustrated in the accompanying drawings.

This invention relates to improvements in hitching devices for animals, and it is carried out as follows, reference being had to the accompanying drawings, on which—

Figure 1:
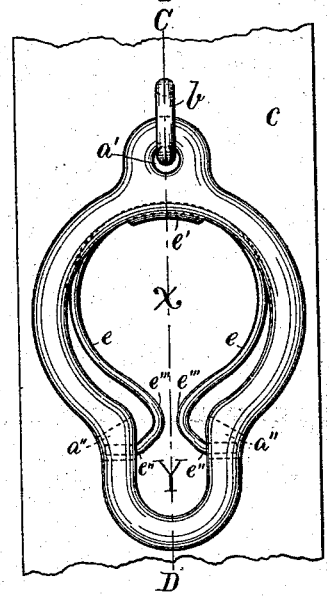
Figure 3:
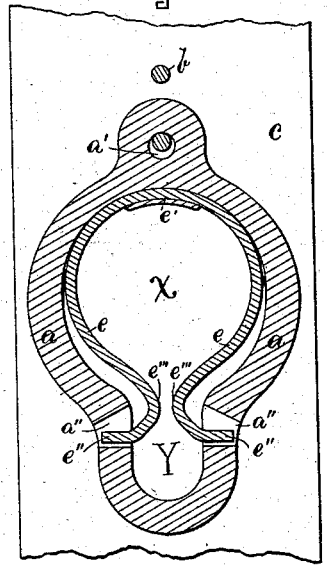
Figure 2:
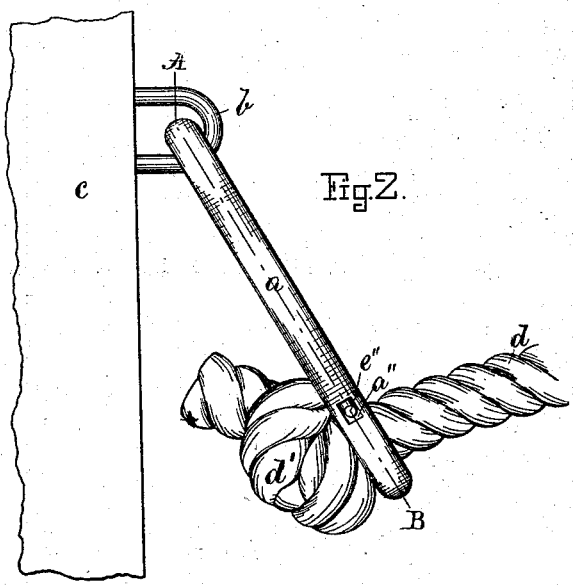

Figure 1 represents a front elevation of the invention. Fig. 2 represents a side elevation with hitching-rope attached. Fig. 3 represents a longitudinal section on the line A B, shown in Fig. 2; and Fig. 4 represents a cross-section on the line C D, shown in Fig. 1.

Similar letters refer to similar parts wherever they occur on the different parts of the drawings.

Figure 4:
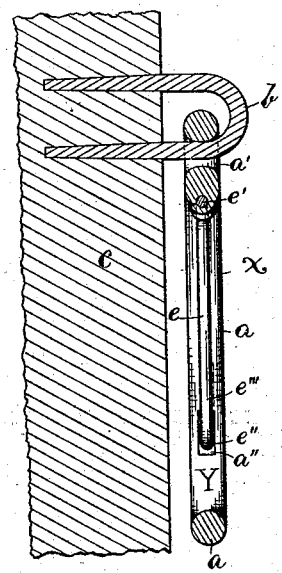

The invention consists of a metal frame, $a$, having a perforation, $a'$, in its upper end adapted to receive and to be suspended from a common staple, $b$, driven in the wall or post $c$, as shown in Figs. 2 and 4. The frame $a$ is made with an upper eye, X, large enough to allow the nut $d'$ on the end of an ordinary hitching-rope, $d$, to pass freely through it at this place. In its lower end the said frame $a$ has a reduced eye, Y, made of sufficient size to allow it to receive an ordinary hitching-rope without allowing the knot on the rope to pass through at this place.

It will be seen that the eyes X and Y are in open communication with each other, so that after the knot on the rope has been introduced at X the rope may be lowered into the eye Y, which is so small that the knot on the rope cannot be pulled through; but as it is also necessary to prevent the rope from working up into the larger eye, X, from the smaller eye, Y, I provide the frame A with an automatic locking device, composed of the spring-wire $e$, secured at $e'$ in a suitable manner to the interior upper portion of the metal frame $a$, as shown. The spring-wire $e$ is bent to form an eye within the eye X of the frame $a$, as shown in Figs. 1 and 3, its extreme lower ends, $e''$ $e''$, being made to project loosely through slotted perforations $a''$ $a''$ in the two opposite sides of the lower part of the frame $a$, as shown. At or near the junction of the eyes X and Y the spring-wire $e$ is closed together at $e'''$, as shown in Figs. 1 and 3, which forms a spring-lock to prevent the rope from working into the upper eye, X, after being laid into the lower eye, Y.

In using my improved hitching device I pass the knot or ball $d'$ of the hitching-rope $d$ through the upper eye, X, and by pulling the rope downward I cause the lower ends of the spring-wire $e$ to expand, so as to allow the rope to pass by the closing part $e'''$ and to drop into the lower eye, Y, in which the knot or ball $d'$ is prevented from being pulled through, as described. If I desire to unhitch the animal, I simply take hold of the rope and pull it upward, causing the spring-wire $e$ to expand at $e'''$ to allow the rope to pass into the larger upper eye, X, which is large enough to allow the knot or ball $d'$ of the hitching-rope to pass through it easily.

This invention may, of course, be made in different sizes, according to the size or nature of the hitching rope or chain that is used, and according to the different kinds of animals that are to be hitched with the device.

The invention is very advantageous on account of its simplicity, strength, and durability, as well as cheapness of manufacture, and animals may be hitched and unhitched by means of it with much ease and rapidity.

What I wish to secure by Letters Patent, and claim, is—

The herein-described hitching device, consisting of the metal frame $a$, with its large and small openings X and Y, combined with the spring-locking wire $e$ $e''$ $e'''$ and slotted grooves or recesses $a''$ $a''$ in the lower part of frame $a$, as and for the purpose set forth.

In testimony whereof I have affixed my signature in presence of two witnesses.

CHARLES E. DYER.

Witnesses:
 ALBAN ANDRÉN,
 HENRY CHADBOURN.